US011178850B2

(12) United States Patent
Click

(10) Patent No.: US 11,178,850 B2
(45) Date of Patent: Nov. 23, 2021

(54) ANIMAL KNEE PROTECTOR

(71) Applicant: Shari Lee Click, Santa Cruz, CA (US)

(72) Inventor: Shari Lee Click, Santa Cruz, CA (US)

( * ) Notice: Subject to any disclaimer, the term of this patent is extended or adjusted under 35 U.S.C. 154(b) by 146 days.

(21) Appl. No.: 16/689,416

(22) Filed: Nov. 20, 2019

(65) Prior Publication Data

US 2020/0196571 A1 Jun. 25, 2020

Related U.S. Application Data

(60) Provisional application No. 62/783,466, filed on Dec. 21, 2018.

(51) Int. Cl.
*A01K 13/00* (2006.01)

(52) U.S. Cl.
CPC .................................. *A01K 13/007* (2013.01)

(58) Field of Classification Search
CPC .................................................... A01K 13/007
See application file for complete search history.

(56) References Cited

U.S. PATENT DOCUMENTS

| | | | | |
|---|---|---|---|---|
| 2,246,100 | A * | 6/1941 | Marzani | A01K 13/007 54/82 |
| 2,937,487 | A * | 5/1960 | Dever | A61D 9/00 54/82 |
| 3,209,517 | A * | 10/1965 | Hyman | A01K 13/007 54/82 |
| 4,342,185 | A | 8/1982 | Pellew | |
| 4,424,809 | A * | 1/1984 | Yovankin | A61D 9/00 54/82 |
| 4,939,818 | A * | 7/1990 | Hahn | A44B 18/00 24/16 R |
| 5,226,191 | A | 7/1993 | Mitchell | |
| 5,871,458 | A * | 2/1999 | Detty | A61D 9/00 602/27 |
| 6,151,873 | A | 11/2000 | Rogers | |
| 6,508,205 | B1 * | 1/2003 | Zink | A01K 13/007 119/850 |
| 7,185,612 | B2 | 3/2007 | Faulk | |
| 2004/0055543 | A1 | 3/2004 | Clement | |
| 2010/0229509 | A1 * | 9/2010 | Mills | A01K 13/00 54/82 |

* cited by examiner

*Primary Examiner* — Steven O Douglas

(57) ABSTRACT

A device for protecting the knee area of an animal leg from damage or abrasion is provided. A protective sheet encircles the animal leg around the knee and is supported in position by a support section resting on the fetlock. The support section is ventilated and the contact areas are softly padded for comfort of the animal.

10 Claims, 2 Drawing Sheets

ANIMAL KNEE PROTECTOR

CROSS-REFERENCE TO RELATED APPLICATIONS

This application claims the benefit of Provisional Application No. 62/783,466, filed 21 Dec. 2018, entitled "Animal Knee Protector", which is incorporated herein by reference.

REFERENCES CITED

U.S. Pat. No. 71,856,1262 Faulk: Animal Wound Shield
U.S. Pat. No. 6,151,873 Rogers: Legging for a Horse
U.S. Pat. No. 5,226,191 Mitchell: Knee Pad for Horses
U.S. Pat. No. 4,342,185 Pellow: Protective Garment for the Legs of a Quadruped of the Horse Genus and Material for Such Garment
US Patent Application Publication 20040055543A1 Clement: Protective Device for a Horse

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention, interchangeably called "animal knee protector" relates generally to devices to prevent injury to the legs of animals. The present invention more particularly relates to the protection of living animal skin from abrasion and infection in the area of the knee joint of the front legs.

BACKGROUND OF THE INVENTION

The maintenance and husbandry of animals includes concerns regarding the threat of skin infections and abrasions. The prior art includes leggings and pads that are applied to cushion legs of animals from contact with or exposure to objects and conditions that can cause or aggravate skin eruptions, open wounds, or blisters.

The prior art provides efforts to protect elements of animal physiology related to joints. In one exemplary area of prior art, protective devices for knee joints of large animals are provided that generally have means of attaching a protective pad around the knee joint (hereafter "the knee"). Certain prior art knee protectors wrap around the knee and attach by gripping the leg above or below the knee, or both above and below the knee. Prior art animal skin protectors of this type have the drawbacks of (1.) restricting the free movement of the target animal joint; (2.) being prone to changing position on the target joint or sliding down the leg, which can render the protector ineffective by undesirable repositioning; (3.) being prone to simply falling off and away from the animal; and (4.) failing to allow sufficient airflow under the pad to control moisture or animal sweat disposed on the animal skin under the pad.

Prior art leg protectors that have been designed for close contact with an animal leg to prevent slippage can contribute to and cause a retention of heat on animal skin, such as near an animal joint, for example a knee.

There is therefore a long-felt need for improved methods and devices for sustainably positioning a protective device relative to a selected area of an animal's knee joint.

SUMMARY OF THE INVENTION

The subject of the present invention, the animal knee protector, is a device for protecting the skin and underlying flesh of the target animal in the area near the knee joint which is prone to injury. This device comprises a protective sheet, a support section, a support pad, a seam cover pad, and a series of attachment straps and their mating retention straps. The animal knee protector is substantially rectangular such that it can be wrapped into a tubular shape around the animal leg.

An advantage with this arrangement is that the protective sheet may be held in its most advantageous position using the anatomy of the animal without excessive gripping force. Said protective sheet is supported in its operative position covering the knee area by the support section which extends further down the leg beyond the protective sheet to reach an area just above the fetlock where it is supported by the support pad resting on the fetlock of the animal. In this manner, the assembly cannot fall down the leg and does not need to be tightly strapped to the leg, allowing mobility. Further, the support section may have multiple ventilation holes, such as a mesh material, to facilitate airflow to the lower leg, and may contain one or more stiffening elements, such as plastic, wood, or metal ribs, to enhance the stiffness useful to support the protective sheet.

A support pad, made of a soft lining material, is provided in the area around the base of the support section to provide gentle contact where the entire device is supported by the animal fetlock.

Preferentially, a seam cover pad, made of a soft lining material, is provided between the skin of the animal leg and the seam connecting the protective sheet to the support section, to prevent abrasion from the edges of the protective sheet and the support section materials where they are joined together.

Multiple attachment straps are connected to a first edge of the two edges of the animal knee protector which meet or overlap when the device is wrapped around the animal leg. Mating retention straps are connected to the opposing edge which meets with or overlaps the first such edge. The attachment straps and retention straps are made of hook and loop material such that they securely hold the animal knee protector closed in its tubular configuration around the animal leg.

According to an advantageous embodiment, the lower attachment strap is located at the elevation of the support pad at the bottom of the device. In the preferred embodiment, the lower attachment strap includes an elastic section to enable maintaining a snug attachment condition. Said elastic section may be contained within a tunnel formed by folding over the material of the support pad to double thickness, thus forming the tunnel inside the support pad to enable the elastic strap to stretch over its entire length and simultaneously be positionally restrained to encircle the animal leg in the area of the support pad.

Other attachment straps do not need to be held in tension as the lower attachment strap does, due to the support structure of the device maintaining position by resting on the fetlock. Therefore, the other attachment straps do not need any elastic connected to them. The other attachment straps securely close the device in its tubular configuration surrounding the animal leg without applying gripping force to the leg. This enhances the animal's mobility and decreases disagreeable irritation. The attachment straps and retention straps may comprise hook and loop fastener strips, but also may be buckles or other fastener types.

The protective sheet may be made from a neoprene material, a natural fiber, a synthetic fiber, an aromatic polyamide, a para-aramid fiber, a synthetic rubber, an organic rubber, or other material with abrasion resistance and cushioning properties.

The soft lining material used for the support pad and the seam cover pad may be a natural absorbent fiber, a natural fleece, a synthetic absorbent fiber, a synthetic absorbent fleece, a natural wicking fiber, a synthetic wicking fiber, or other soft material.

BRIEF DESCRIPTION OF THE FIGURES

These, and further features of various aspects of the present invention, may be better understood with reference to the accompanying specification, wherein.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention and are not limited to the methods and materials described. Fastener materials denoted "hook" and "loop" may be interchanged and function equivalently.

It must be noted that as used herein and in the appended claims, the singular forms "a", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
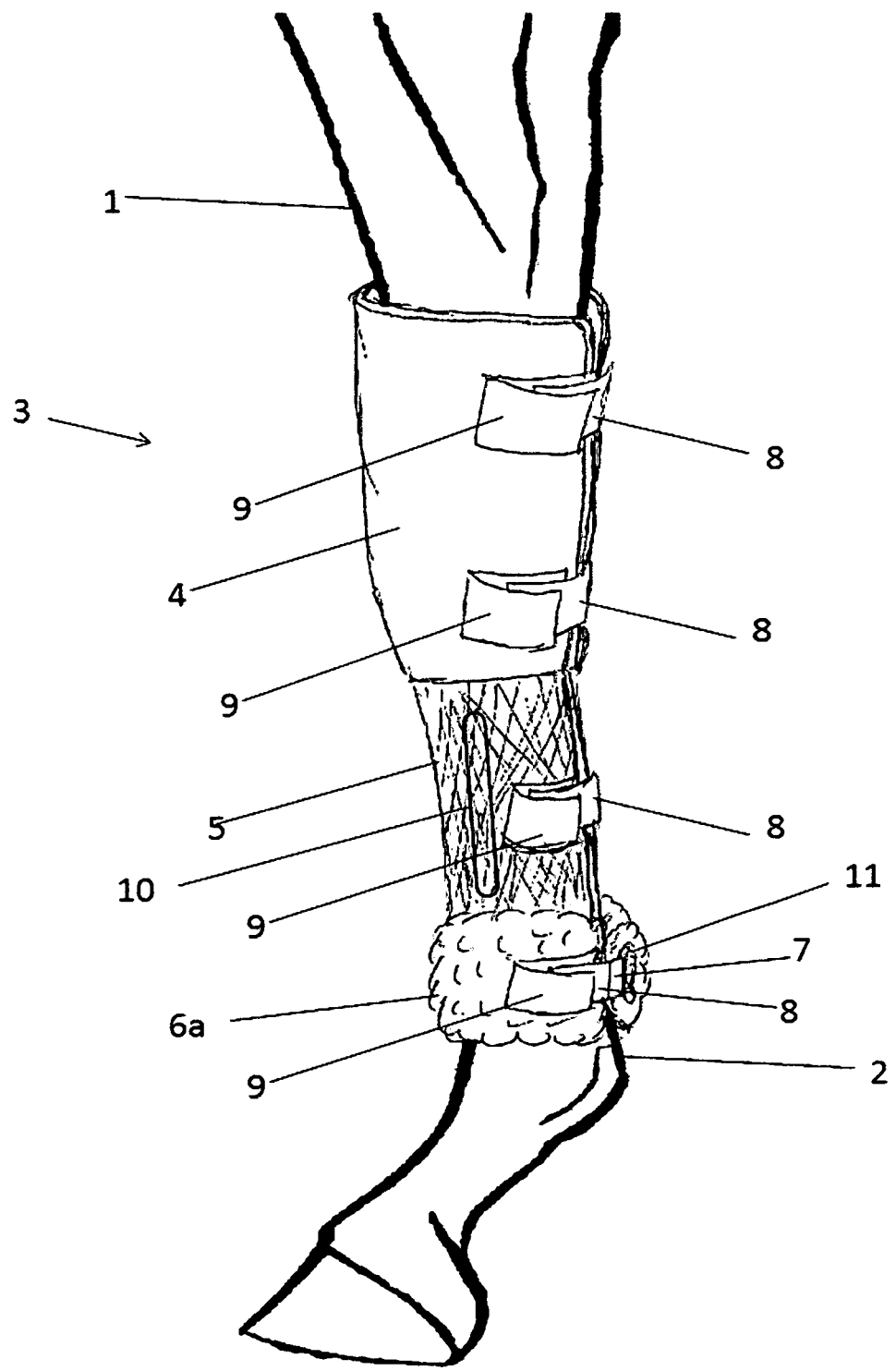
FIG. 1 is a side view of the foreleg of an animal 1 fitted with the animal knee protector. It is understood that the method of the present invention may be applied to other joints, hocks and skin covered aspects of various animals, such as horses or sheep.

FIG. 1 is a side view of an animal leg 1 with an animal knee protector 3 in proper position. The protective sheet 4 is supported in place by the support section 5, which is itself supported in place by support pad 6a, which in turn is supported by the animal's fetlock joint. The support pad 6a and support section 5 thereby retain the protective sheet 4 in proper functional position. Support section 5 is stiffened by stiffening element 10. Attachment straps 8 are double sided loop fastener material and are secured by retention straps 9, which comprise hook fastener material and are folded face-to-face to grip both inner and outer surfaces of attachment straps 8. Sets of attachment straps 8 and retention straps 9 are disposed in a number of positions along the length of the device. Lower attachment strap 8 is tensioned by elastic strap 7 to provide secure binding just above fetlock 2. The soft material of support pad 6a protects the animal's skin from abrasion under the tension of the lower straps 7, 8, and 9, and from the stretching of elastic strap 7 as it slides within its tunnel 11 through the folded-over support pad 6a material. Protective sheet 4, in its supported position does not need the straps 8 and 9 to be tightened excessively to maintain position. They are useful to keep the protective sheet in a closed tubular configuration, loosely but securely surrounding the animal leg 1. Similarly, any straps 8 and 9 around the support section 5 may be used for only securing closure of the support section in its tubular shape rather than snugly pulling it against the animal leg 1. Support section 5 may be a ventilated material such as a mesh fabric or screen, and may be assisted in its function of supporting protective sheet 4 by one or more stiffening elements 10, sewn or otherwise attached to support section 5.

Figure 2:
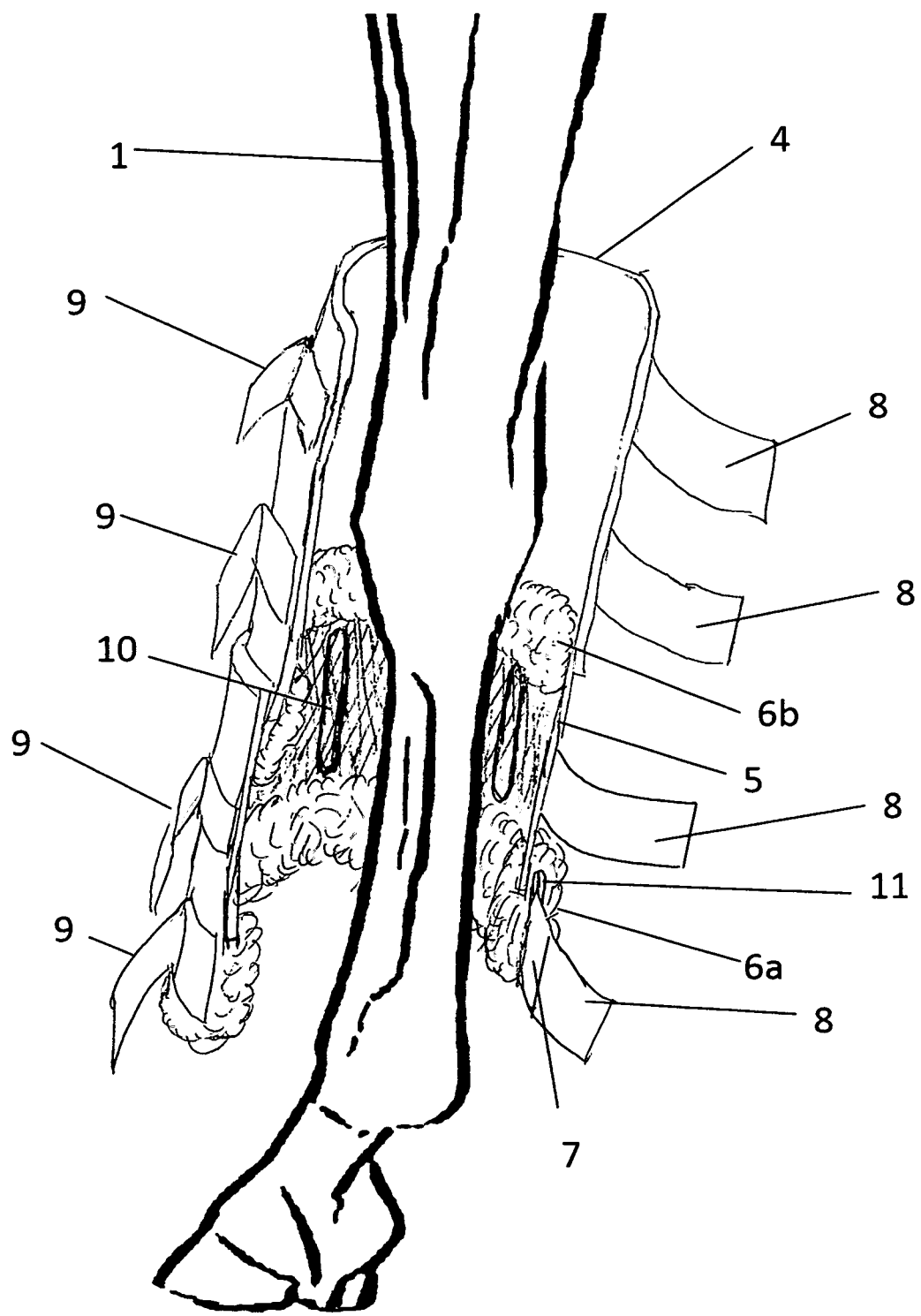
FIG. 2 is an oblique rear view of the foreleg of an animal 1 shown with the animal knee protector open to reveal the elements of its construction.

FIG. 2 shows animal knee protector 3 in an open position revealing the surfaces exposed to the animal leg, including the inner surfaces of protective sheet 4, support section 5, support pad 6a, and now visible in this figure is a band of seam cover pad 6b covering the edges of protective sheet 4 and support section 5 at the seam where they join each other, in order to protect the animal skin from any roughness of the material edges at that seam. Support pad 6a and seam cover pad 6b are made of a soft material such as a natural absorbent fiber, a natural fleece, a synthetic absorbent fiber, a synthetic absorbent fleece, a natural wicking fiber, or a synthetic wicking fiber. Retention straps 9 are shown in face-to-face pairs in their open position before being closed around both front and back surfaces of attachment straps 8. The lower attachment strap 8 is shown attached to one end of elastic strap 7. The other end of elastic strap 7 is secured to support section 5. Stretching elastic strap 7 allows the application of tension to the lower attachment strap 8 and corresponding lower retention strap 9 thus securing the animal knee protector to the animal leg. Elastic strap 7 is shown protruding from its tunnel 11 in the folded-over shape of support pad 6a. This allows it to stretch through the tunnel without abrading the animal skin.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

What is claimed is:

1. A knee protector comprising:
   a. a protective sheet of a relatively soft material, for at least partially protectively encircling an animal leg around the knee of the animal leg from an elevation on the leg above the knee to an elevation below the knee; and
   b. a support section of a material that is relatively stiffer with respect to the relatively soft material of the protective sheet coupled to the bottom terminus of the protective sheet and extending downward from the protective sheet to an elevation near the fetlock joint, whereby the support section supports the protective sheet from falling down the leg from its position around the knee; and
   c. a support pad of a material that is relatively softer with respect to the material of the support section at the base of the support section supporting the support section on the fetlock of the animal leg and thus preventing the support section and therefore the protective sheet from falling down the leg; and
   d. one or more attachment straps maintaining the knee protector in a tubular configuration around the animal leg.

2. The knee protector of claim 1, wherein the protective sheet comprises a material selected from the material group consisting of a neoprene material, a natural fiber, a synthetic fiber, an aromatic polyamide, a para-aramid fiber, a synthetic rubber and an organic rubber.

3. The knee protector of claim 1, wherein the support section comprises a material with a plurality of ventilating holes.

4. The knee protector of claim 1 wherein the support section includes stiffening elements.

5. The knee protector of claim 1, wherein the lower attachment strap is tensioned by an attached elastic strap.

6. The knee protector of claim 5, wherein the elastic strap is contained within the support pad at the base of the support section, allowing additional stretch along its length.

7. The knee protector of claim 1, wherein the attachment straps comprise hook and loop fastener materials.

8. The knee protector of claim 7, wherein the hook and loop attachment straps are arranged to use front and back surfaces of one of the straps, engaging with face-to-face surfaces of a pair of mating straps.

9. The knee protector of claim 1, wherein the support pad is a soft material.

10. The knee protector of claim 1, wherein a seam cover pad covers the joint between the protective sheet and the support section.

* * * * *